United States Patent
Malkin

(10) Patent No.: US 11,068,420 B2
(45) Date of Patent: Jul. 20, 2021

(54) SCALABLE SOFTWARE STACK

(71) Applicant: Hewlett Packard Enterprise Development LP, Houston, TX (US)

(72) Inventor: Kirill Malkin, Morris Plains, NJ (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 938 days.

(21) Appl. No.: 14/710,492

(22) Filed: May 12, 2015

(65) Prior Publication Data

US 2016/0335002 A1 Nov. 17, 2016

(51) Int. Cl.
*G06F 9/52* (2006.01)
*G06F 9/50* (2006.01)
*G06F 13/16* (2006.01)

(52) U.S. Cl.
CPC ........ *G06F 13/1663* (2013.01); *G06F 9/5016* (2013.01); *G06F 9/5077* (2013.01); *G06F 9/52* (2013.01); *G06F 9/526* (2013.01)

(58) Field of Classification Search
CPC ...... G06F 3/0619; G06F 3/067; G06F 3/0683; G06F 3/0644; G06F 3/0659
See application file for complete search history.

(56) References Cited

U.S. PATENT DOCUMENTS

| | | | |
|---|---|---|---|
| 5,307,495 A | 4/1994 | Seino et al. | |
| 6,484,185 B1 | 11/2002 | Jain et al. | |
| 7,430,644 B2 * | 9/2008 | Otani | G06F 3/0614 711/114 |
| 7,958,381 B2 * | 6/2011 | Fontenot | G06F 1/3221 365/226 |
| 8,103,827 B2 * | 1/2012 | Liguori | G06F 3/0619 711/114 |
| 8,230,435 B2 * | 7/2012 | Brice, Jr. | G06F 3/0622 713/150 |
| 8,478,835 B2 * | 7/2013 | Kimmel | G06F 12/0868 709/212 |
| 8,640,138 B2 * | 1/2014 | Brice | G06F 3/0622 713/150 |

(Continued)

FOREIGN PATENT DOCUMENTS

| | | |
|---|---|---|
| CN | 101346700 A | 1/2009 |
| CN | 102662913 A | 9/2012 |

(Continued)

OTHER PUBLICATIONS

Acacio et al., "Owner Prediction for Accelerating Cache-to-Cache Transfer Misses in a cc-NUMA Architecture", IEEE, 2002, pp. 1-12, http://citeseerx.ist.psu.edu/viewdoc/download?doi=10.1.1.2.7443&rep=rep1&type=pdf.*

(Continued)

*Primary Examiner* — Christopher D Birkhimer
(74) *Attorney, Agent, or Firm* — Hewlett Packard Enterprise Patent Department

(57) ABSTRACT

A scalable software stack is disclosed. In particular, the present disclosure provides a system and a method directed at allocating logical ownership of memory locations in a shared storage device among two or more associated compute devices that have access to the storage device. The logical ownership allocation can minimize potential conflicts between two simultaneous accesses occurring within the same memory location of the storage device.

20 Claims, 5 Drawing Sheets

(56) References Cited

U.S. PATENT DOCUMENTS

| | | | | |
|---|---|---|---|---|
| 8,762,595 | B1* | 6/2014 | Muller | G06F 13/385 710/22 |
| 8,762,680 | B2* | 6/2014 | Arndt | G06F 9/5077 711/112 |
| 2001/0039550 | A1 | 11/2001 | Putzolu | |
| 2002/0052914 | A1 | 5/2002 | Zalewski et al. | |
| 2003/0110205 | A1 | 6/2003 | Johnson | |
| 2006/0173851 | A1 | 8/2006 | Singh et al. | |
| 2008/0155203 | A1 | 6/2008 | Augilar et al. | |
| 2008/0184247 | A1 | 7/2008 | Hughes et al. | |
| 2008/0288811 | A1 | 11/2008 | Sudhakar | |
| 2009/0019248 | A1 | 1/2009 | Jeong et al. | |
| 2009/0204972 | A1* | 8/2009 | Brice, Jr. | G06F 3/0622 718/104 |
| 2009/0327779 | A1* | 12/2009 | Fontenot | G06F 1/3221 713/323 |
| 2010/0017496 | A1* | 1/2010 | Kimmel | G06F 12/0868 709/212 |
| 2010/0070718 | A1 | 3/2010 | Pong | |
| 2010/0217930 | A1* | 8/2010 | Liguori | G06F 3/0619 711/114 |
| 2011/0258399 | A1 | 10/2011 | Sumi et al. | |
| 2012/0216211 | A1* | 8/2012 | Brice, Jr. | G06F 3/0622 718/104 |
| 2013/0198484 | A1* | 8/2013 | Arndt | G06F 9/5077 711/173 |
| 2014/0089572 | A1 | 3/2014 | Koka et al. | |
| 2014/0101667 | A1* | 4/2014 | Brice, Jr. | G06F 3/0622 718/104 |
| 2014/0281117 | A1* | 9/2014 | Hepkin | G06F 9/45533 711/6 |
| 2014/0281118 | A1* | 9/2014 | Hepkin | G06F 9/45533 711/6 |
| 2014/0359248 | A1 | 12/2014 | Peters et al. | |

FOREIGN PATENT DOCUMENTS

| | | |
|---|---|---|
| WO | PCT/US16/32117 | 5/2016 |
| WO | WO 2016/183328 | 11/2016 |

OTHER PUBLICATIONS

Laudon et al., "The SGI Origin: A CCNIJMA Highly Scalable Server", ACM, 1997, pp. 1-11, https://www.ece.cmu.edu/~ece740/f13/lib/exe/fetch.php?media=p241-laudon.pdf.*

PCT Application No. PCT/US2016/032117, International Search Report and Written Opinion dated Aug. 12, 2016.

Extended European Search Report received in EP Application No. 16793531.1, dated Apr. 12, 2018, 9 pages.

Wang et al., "Oruta: Privacy-Preserving Public Auditing for Shared Data in the Cloud", IEEE Transactions on Cloud Computing, vol. 2, No. 1, Jan.-Mar. 2014, pp. 43-56.

Zhou et al., "Distributed storage and retrieval of massive small files metadata", Journal of Air Force Early Warning Academy, vol. 28 No. 6, Dec. 2014, 5 pages.

* cited by examiner

400

Identify the computing devices associated with a particular memory device
405

Create a number of unique subdivisions of memory locations within the particular memory device for each computing device associated with the particular memory device.
410

Assign, for each computing device, a unique subdivision of memory locations within the memory device.
415

FIG. 4

SCALABLE SOFTWARE STACK

BACKGROUND

Field of Invention

The present invention generally relates to software stacks. More specifically, the present invention relates to a more efficient manner of writing into a shared memory device while minimizing potential conflicts between two simultaneous accesses into the same memory location.

Description of the Related Art

Software stacks generally refer to a group of programs that work in connection with each other to complete a common goal or assignment. Software stacks also refer to a set of applications that operate in a particular order while being directed to complete a particular goal or assignment. Examples of software stacks may include a Linux-based software stack—LAMP (Linux, Apache, MYSQL, Perl/PHP/Python) or a Windows-based software stack—WINS (Windows Server, Internet Explorer, .NET, SQL Server).

As a result of using multiple programs and applications in a software stack, a concern may arise with respect to data being stored in, read from, modified in, and deleted from memory by each of the programs and applications of a participating software stack. Many of the programs and applications in any given stack may be reading, writing, and modifying the same data. As a result, two different entities may be reading or writing in a same designated space in memory. If such a situation occurs, the data in the space may become corrupted since there is no way to determine the status of the data at any given point in time.

There is a need, therefore, for a method of reading, writing and modifying data within shared memory among a plurality of different programs and applications so that when situations occur when two or more programs and/or applications are instructed to operate on the same data, there is minimal opportunity that the data can become corrupted.

SUMMARY OF THE CLAIMED INVENTION

A scalable software stack is claimed. In particular, the present disclosure provides a method whereby scalable software stacks can efficiently access (e.g., read and write) a shared memory device while minimizing potential conflicts between simultaneous accesses into the same memory location by two or more programs or applications. The method includes assigning each compute device their own respective memory location within a storage device that only that particular compute device can, for example, write into or modify. By assigning ownership to a particular memory location to one compute device, the method reduces potential conflicts between simultaneous accesses into the same memory location. The ownership can also be used to determine when the data stored in a particular memory location has been last updated in order to ensure that a most current read of the data is being obtained.

BRIEF DESCRIPTION OF THE DRAWINGS

FIG. 4 illustrates a method for allocating each compute node their own respective partition.

DETAILED DESCRIPTION

Systems and methods for a scalable software stack are described herein. In the following description, details are provided to explain various embodiments of the present invention. It should be noted, however, that the present invention may be practiced without some of the details provided. Some details may also be omitted for the sake of simplifying or generalizing a particular embodiment of the present invention.

Figure 1:
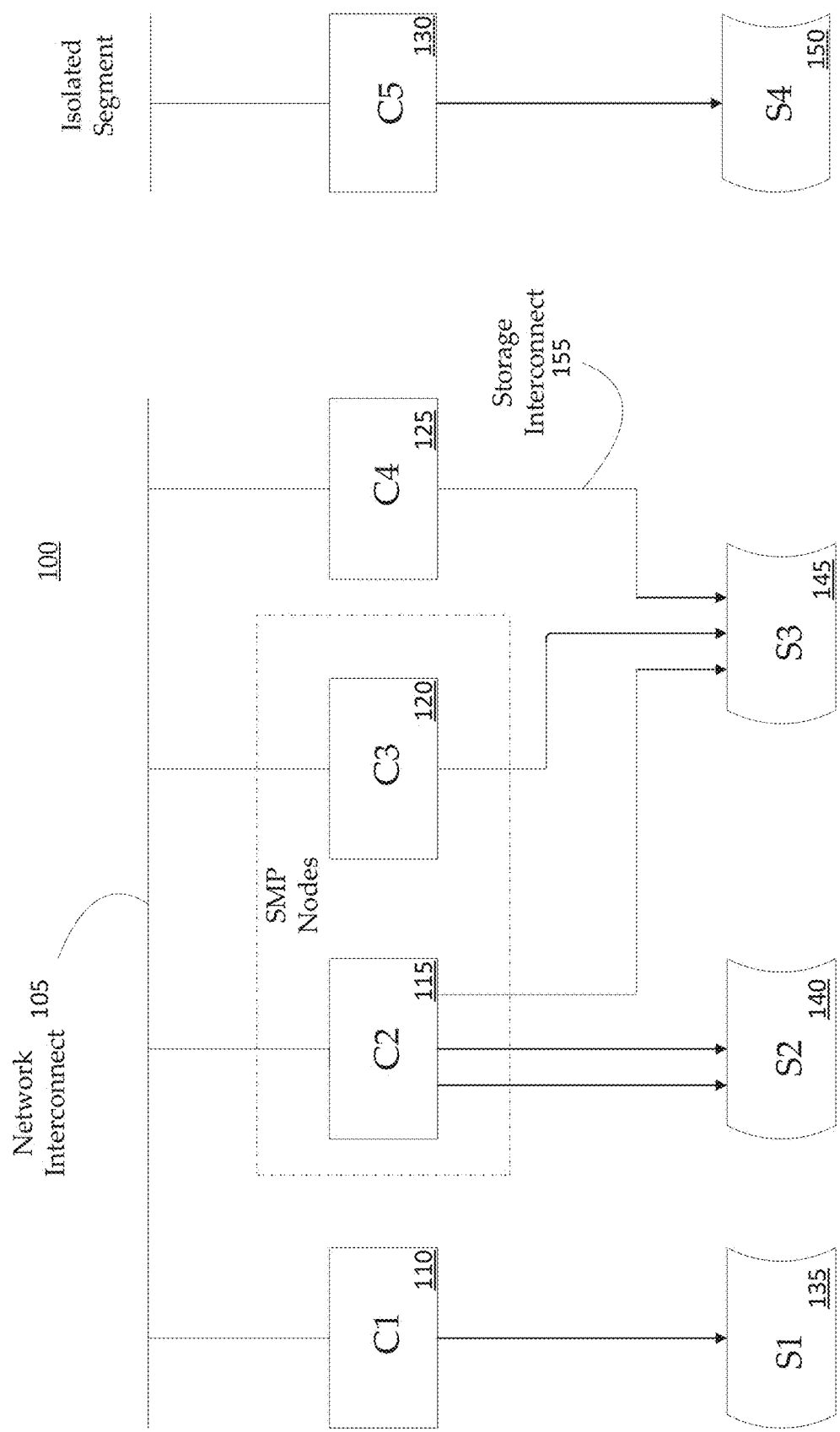
FIG. 1 illustrates an exemplary system of multiple compute devices and memory devices implemented in the present invention.

FIG. 1 illustrates an exemplary system of multiple compute devices and memory devices implemented in the present invention. The system 100 of FIG. 1 is a simplified model that may include a plurality of computing devices C1-C5 110-130 and a plurality of storage devices S1-S4 135-150.

The compute devices C1-C5 110-130 may be any available general computer devices or processors. These compute devices 110-130 may possess modern architectures currently being implemented and may not need to be specialized to perform the processes of the present invention described herein.

The storage devices S1-S4 135-150 may be any general memory available. In particular, the storage devices 135-150 are capable of storing data that is written by the various associated computing devices C1-C5 110-130 for an indefinite period of time. It should be noted that Random Access Memory (RAM) and other similar types of memory may not be ideal for the present invention since, for example, RAM possesses temporary storage capabilities for data. The data stored into RAM may be lost when the RAM is not in use. This does not change, however, the applicability of the present invention to incorporate RAM in various embodiments.

The system of FIG. 1 may include a plurality of network interconnects 105 and storage interconnects 155. The network interconnects 105 may be used to connect the plurality of compute devices 110-125 to each other. The storage interconnects 155 may be used to connect the compute device 110-130 with one or more storage devices 135-150. The network interconnects 105 and storage interconnects 155 can be electrical, optical or wireless connections or cables implemented to connect two separate devices. Exemplary interconnects that may be utilized in the present invention may include Ethernet, Infiniband, Fibre Channel, SAS (Serial Attached SCSI), PCIe (Peripheral Component Interconnect Express) or Memory Channel.

The computing devices C1-C4 110-125 of FIG. 1 may be connected to one another through use of various network interconnects 105. In an exemplary embodiment, the computing device C5 130 of FIG. 1 is illustrated as being isolated from computing devices C1-C4 110-125. This may be indicative of the computing device C5 130 being completely unable to communicate with the other computing devices C1-C4 110-125 whether it be through providing data requests for information in the storage devices S1-S3 135-145 that computing device C5 130 is not connected to or receiving requests from the other computing devices C1-C4 110-125 for information stored in storage device S4 150. Also illustrated in FIG. 1 is implementation of a plurality of storage interconnects 155 that connect the various computing devices C1-C5 110-130 to their respective storage devices S1-S4 135-150.

As illustrated in FIG. 1, each of the compute devices C1-C5 110-130 may have direct access to one or more corresponding storage devices S1-S4 135-150. Some compute devices (e.g., compute device C1 110) may be directly connected to one storage device (e.g., storage device S1 135) through the use of one or more storage interconnects 155. Other compute devices (e.g., compute device C2 115), on the other hand, may share storage devices (e.g., storage devices S2, S3 140, 145) with one or more other compute devices.

A compute device (e.g., compute device C2 115) may have multiple storage interconnects 155 to the same storage device (e.g., storage device S2 140). Implementation of multiple storage interconnects 155 to the same storage device from a single compute device may provide redundancy and improved bandwidth for transferring data between the compute device and the storage device. The use of multiple storage interconnects 155 can be helpful in situations where one of the storage interconnects 155 between a particular compute device and the storage device is inefficient (e.g., busy, failed). The use of multiple storage interconnects 155 can also be used for redundancy to ensure that the information has been transferred between desired devices even if one or more of interconnects have failed.

To illustrate the above feature, in an exemplary embodiment, compute device C2 115 may be instructed to transmit a data request to storage device S2 140. The data request from the compute device C2 115 can be sent to the storage device S2 140 using one or both of the storage interconnects 155 that are available between the compute device C2 115 and the storage device S2 140. If a situation where one of the two storage interconnects 155 is busy at the time the data request is sent out, the compute device C2 115 can utilize the less busy storage interconnect 155 for better efficiency.

Once the data request from the compute device C2 115 has been received at the storage device S2 140, the requested data can then be transmitted from the storage device S2 140 to the compute device C2 115. The data may be transmitted across one or both of the available storage interconnects 155. By using both storage interconnects 155, improved bandwidth for the transmission of the data from the storage device S2 140 to the compute device C2 115 can be provided similar to the above situation. Redundancy may also be incorporated by using both storage interconnects 155 to ensure that the data can be delivered to the compute device C2 155 even if one or more of the storage interconnects 155 have failed. In situations where one of the two storage interconnects 155 fails or may become busy, the compute device C2 115 may still be able to receive the requested data from the storage device S2 140 by using the other storage interconnect 155 associated with other compute devices. Compared to the above situation, scenarios utilizing one storage interconnect 155 between the compute device and the storage device (e.g., compute device C1 110 and storage device S1 135) may not have the same benefits of added redundancy and improved bandwidth.

In a similar manner where a single compute device has multiple storage interconnects 155 that can be used to access data from a single storage device (e.g., compute device C2 115 and storage device S2 140), a parallel embodiment may be implemented with respect to the computing devices and corresponding network interconnects 105. In particular, as illustrated in FIG. 1, multiple compute devices may have a direct access to the same storage device (e.g., compute devices C2-C4 115-125 and storage device S3 145). The compute device C1 110 may be able to request one, two or all three of the compute devices C2-C4 115-125 to access and transmit data stored in the storage device S3 145 back to compute device C1 110. In this scenario, each of the compute devices C2-C4 115-125 may be viewed as a single communication channel that can provide the requested information from the storage device S3 145 having redundancy and improved bandwidth along with the other compute devices forming additional communication channels. This scenario where compute device C1 110 communicates with the compute devices C2-C4 115-125 to obtain information stored in storage device S3 can resemble a plurality of storage interconnects described above with respect to the compute device C2 115 and the storage device S2 140.

With continued reference to FIG. 1, the embodiment may include Symmetric Multi-Processing (SMP) nodes. In particular, the compute devices C2 and C3 115, 120 may be interconnected in a manner where the two compute devices may be running the same operating system (OS) image, also known as a single system image (SSI). One benefit of having compute devices C2 and C3 115, 120 being an SMP node may be that the two devices can share the same memory associated with computing devices. Having compute devices C2 and C3 115, 120 operate on a single OS can allow either computing device to access the resources (e.g., information stored in memory or connected storage devices) almost transparently from the other compute device. The transparency can be implemented by instructing the connected storage device to directly communicate (e.g., transfer the requested data) to the other connected node.

There may be embodiments where one or more computing devices (e.g., compute device C5 130) may be isolated from the other computing devices (e.g., compute devices C1-C4 110-125). This may also be true with corresponding storage devices as well. Although the situation where a single compute device and storage device is completely isolated from the rest of the system 100 (e.g., compute device C5 130 and storage device S4 150) is not a practical feature of the present invention, this situation may occur if all available network interconnects 105 to the compute device C5 130 fail (e.g., become busy or are faulty). In the situation where an isolated segment is present, the compute device may be unable to communicate with other compute devices and access information from other storage devices. In such scenarios, it may be beneficial to maintain a copy of the information residing on the isolated storage device (e.g., storage device S4 150) also on the other storage devices. Therefore, storage devices S1-S3 135-145 may also include information stored in the storage device S4 150 that could be used to reconstruct the information stored in the storage device S4 150 in case of segment isolation.

As described above, there may be many different possibilities in which a single compute device can access and obtain data from storage devices. Some methods incorporating the many different possibilities described above (e.g., multi-pathing, using multiple interconnects) may provide increased bandwidth for data transmission and added redundancy. Although implementation of the above methods, whereby multiple channels can be used to access the requested information, can provide benefits for data transmission in the overall system, other issues may also arise. One such situation is described below.

Figure 2:
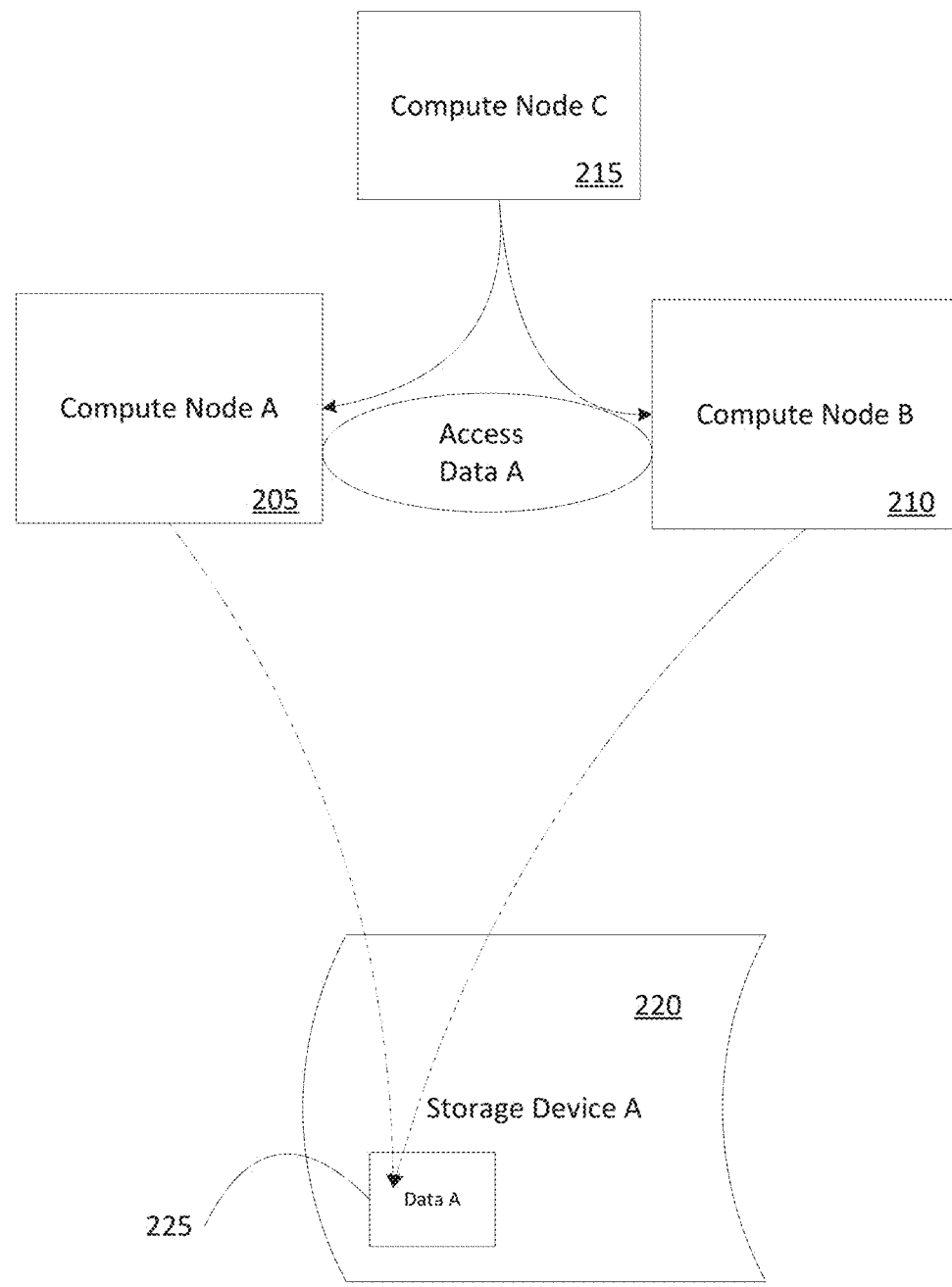
FIG. 2 illustrates a scenario where multiple accesses (simultaneous or in near-succession) are performed on the same data stored in a storage device.

FIG. 2 illustrates a scenario where multiple accesses (simultaneous or in near-succession) are performed on the same data stored in a storage device. In particular, as shown in the figure, compute nodes A and B 205, 210 both share the same storage device 220. The two compute nodes A and B 205, 210 are also attempting to access the same memory location 225 based on instructions to perform an operation to the data stored in the memory location 225. In general, a memory associated with the storage device 220 may include a vastly large area of possible memory locations capable of housing data from a plurality of processes without much risk of overlapping. A scenario, however, may come up where multiple compute devices, upon responding to the same data request, may attempt to access the same memory location 225.

As illustrated in FIG. 2, an embodiment may include a compute node C 215 that is capable of providing the same instruction to both compute nodes A and B 205, 210. Both the compute nodes A and B 205, 210 are simultaneously performing the requested process/instruction (e.g., access and obtain Data A from the storage device 220).

A situation can arise where multiple compute devices may be instructed to operate (e.g. "write") in the same memory location. This can lead to conflicts since multiple compute devices may be operating (e.g., accessing, writing or modifying) on the same memory location simultaneously or in close succession. Multiple operations simultaneously (or in near succession) by two or more different compute devices may lead to data corruption if the system is unable to maintain the expected order of operations among the different compute devices, and the data in the memory location after all the operations have been performed can be undetermined. For example, a situation may arise where two compute devices are instructed to write into the same memory location. In another example, a compute device may be instructed to read data from the memory location in a close proximity of another compute device being instructed to modify the data within the same memory location. In both these examples, it is important to ensure that the appropriate data is stored into and read from the memory location. Such a situation may occur when multiple compute devices (e.g., compute devices C2-C4 115-125 of FIG. 1) have access to the same storage device (e.g., storage device S3 145) or when a compute device is executing operations on behalf of other compute devices.

In view of the above scenarios, there may be a need to coordinate operations of the plurality of compute devices if multiple compute devices are performing accesses into the same memory location of the same storage device. Coordination can be desired to minimize or prevent potential conflicts where two or more compute devices may access, read and/or write in the same area of data. The data may be corrupted when the computing devices are unable to determine what the data should be if two computing devices begin and end reading/writing simultaneously or within close succession.

A traditional approach to solve the above problem relies on assigning logical locks (or "reservations") for a particular compute device prior to executing of a desired operation (e.g., write). In other words, if the logical lock is granted for the particular compute device, the operation by the compute device can continue. If the logical lock can't be granted immediately for the particular compute device (e.g., the logical lock was granted to another compute device), the compute device may need to wait until the logical lock is released and can be granted. The wait associated with the granting of the logical lock for the particular compute device may delay the execution of the software stack running on that compute node.

The process of granting the lock must ensure that no other compute node has the logical lock already granted in order to prevent a simultaneous modification into a single memory location. In other words, only one compute node at any time may have the granted logical lock to proceed with executing operation into a particular memory location. To carry out the above precaution, a deterministic method of checking with all other compute nodes that may have been granted the logical lock would need to be performed to ensure that only one logical lock is provided. While many such methods exist in the prior art to evaluate and ensure that only one logical lock has been granted, these methods all suffer from scalability issues. In other words, the more compute nodes that are connected to memory, a corresponding larger number of checks would need to be performed before verifying whether a logical lock can be granted at a present time. The scalability of performing such evaluations limits the number of compute nodes and storage devices in the system as the number of compute nodes may require greater overhead in determining whether a logical lock can be granted.

A possible solution, as described in the present invention, can be allocating logical ownership of corresponding non-overlapping sections of memory within shared storage devices. A particular compute node can be assigned sole logical ownership to the section and would have the sole ability to write and/or modify data in a given memory location. An embodiment implementing the above solution can prevent situations where two or more compute devices may access the same memory location or seek to overwrite or modify the data stored in the same memory location at similar time or at the same time.

The approach described above can also help address scenarios involving isolated segments. In particular, the compute node assigned to a particular section can continue to write data into the section of memory that it logically owns without the need to synchronize with the rest of the system.

Figure 3:
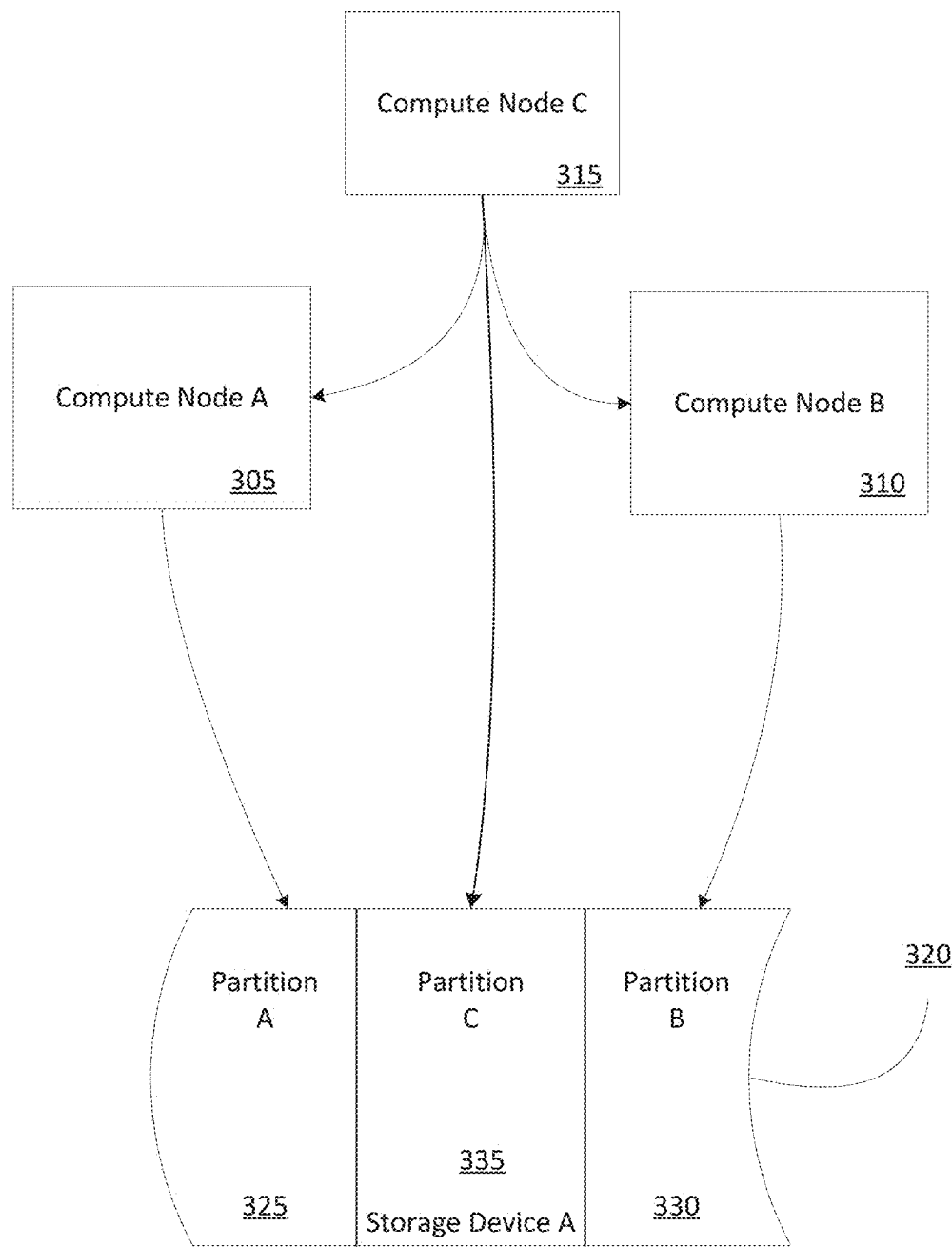
FIG. 3 illustrates a storage device that has been partitioned into a plurality of distinct sections so that each compute node has its own respective section in the storage device.

FIG. 3 illustrates a storage device 320 has been partitioned into a plurality of distinct sections 325-335 so that each compute node 305-315 has its own respective section 325-335 in the storage device 320. In some embodiments, one or more compute nodes (e.g, compute node C 315) may still be assigned a partition within the storage device 320 without being directly connected to the storage device 320. The compute node can still access their assigned partition within the storage device 320 through the use of the other compute nodes that do have direct connections with the storage device 320.

With reference to the figure, three partitions 325-335 are assigned to the compute nodes A, B and C 305-315, respectively. Each compute node has logical ownership to, for example, write, modify, overwrite, or delete data in a particular memory location within their assigned partition. Each partition 325-335 include a unique set of memory locations that does not overlap with other memory locations assigned to other partitions within the storage device 320.

FIG. 4 illustrates a method for allocating each compute node their own respective partition (i.e. section or subdivision of the storage device). In particular, the method 400 illustrated in FIG. 4 facilitates an implementation of the embodiment illustrated in FIG. 3.

In step 405, the method 400 may include performing calculations used to determine how memory locations can be allocated within a single storage device. As seen in FIG. 1, a storage device may have any number of associated compute devices that can have direct access to memory locations housed by the storage device. For example, storage device S1 135 may have only one compute device C1 110 that has a direct connection with the storage device. On the other hand, storage device S3 145 may have three compute devices C2-C4 115-125 that have a direct connection with the storage device. It should be noted that varying numbers of compute devices can be connected to a single storage device. There may be other embodiments that include differing numbers of compute devices connected to a single storage device not described herein.

Once a number of unique subdivisions have been decided upon, these subdivisions can then be created as seen in step 410. Identifying a number of associated compute devices may be necessary in determining how many unique subdivisions should be created in an embodiment. Generally, one unique subdivision is created for each compute device connected to a particular single storage device. There may be embodiments, however, that creating a number of unique subdivisions less than the total number of compute devices available may be possible. For example, there may be embodiments where some compute devices may be instructed only to perform "read" operations into the attached storage device. These compute devices may then be disregarded for assignment of a unique subdivision since, for example, these "read-only" compute devices do not need the ability to manage data (e.g., write or modify) within the storage device. In this way, the compute devices that do manage data within the storage device can be provided memory locations within the storage device as necessary.

In some other embodiments, a number of subdivisions may be created such that there are more subdivisions than available compute devices. For this scenario, it may be possible to have one compute device be assigned to more than one unique subdivision. Each unique subdivision, however, will still only possess one owner that has the ability to write or modify the data stored in memory locations within the unique subdivision.

In step 415, each of the unique subdivisions is assigned to a single compute device. As indicated above, the assignment of a subdivision corresponds to providing logical ownership of each memory location within the unique subdivision to that compute device. The logical ownership allows only that compute device to manage data within memory locations of the unique subdivision. This logical ownership, however, does not affect the ability of other compute devices from accessing (e.g., reading) data stored in the memory locations within the unique subdivision.

In an embodiment, the designated memory locations assigned to each compute node may be static or dynamic. In one embodiment, the memory locations for each compute node can be assigned during an initial configuration of the corresponding storage devices. During the initial configuration, each compute node can be assigned logical ownership to non-changing (or static) memory location(s) of the storage device.

In another embodiment, allocation of memory location for each compute node can be adjusted based on demand. For example, if one compute node tends to do more operations of writing new information into memory, this particular compute node may be reallocated more memory if other compute nodes do not perform such operations as frequently. Conversely, an already assigned memory location to one compute node may similarly be reassigned to a different compute node if the latter compute node performs more operations into memory than current owner.

In other embodiments, certain locations that are written into infrequently by the assigned compute node can be dynamically and temporarily declared as read-only locations. Allocation of these locations as "read-only" can improve read performance at least until the assigned compute node resumes write operation with the read-only locations.

With the above embodiments, a scenario where two or more compute nodes attempt to operate (e.g., write) into the same memory location, as discussed in FIG. 2, can be reduced. Allocation of logical ownership of memory location to one compute node can dictate that only one compute node at any one time may have the sole ability to modify or write data into a particular memory location. Tracking what the data should be in a particular memory location at any given time can now be performed more easily and efficiently.

The above logical allocation of separate memory locations for each compute node assigned to a particular storage device does not, however, affect the ability of any compute node to access (e.g., read) data stored in a particular memory location. In other words, the logical ownership of a memory location may not restrict a compute node from accessing the memory location to perform, for example, a search or read. The above logical ownership allocation may only pertain to a particular compute node authority to "write" or modify the particular memory location. As an added benefit of the present invention, a more efficient way for a compute device to determine whether a current "read" of data in a particular memory location is the most up-to-date can also be achieved.

In the prior art, when multiple compute nodes are capable of reading and/or writing in the same memory location simultaneously (or in near succession to other reads and/or writes), it can be unclear whether a current read of data in the memory location is up-to-date. For example, while a read is being performed by one compute device in a particular memory location, another compute node may be modifying the data in the same memory location. To determine whether data in the particular memory location is up-to-date, the compute device performing the data read may need to request confirmation from all compute devices that have access to that particular memory location. The confirmation could be directed towards determining whether a most recent "write" performed by a particular compute device coincided with the data read. Based on the number of compute devices that can have access to that particular memory location, such a determination by the compute device can be cumbersome and expensive. If no recent "write" operations had been performed, the compute device can provide the current data read from the memory location in question. Otherwise, if it was determined that the data was modified during the time the first read was being performed, the compute device may perform a re-read of the same memory location to obtain a more current form of the data stored in the same memory location.

In view of the present invention, an improved method over the prior art described above for determining if data in a particular memory location is up-to-date is provided. In particular, the present invention can simplify a determination whether data in a particular memory location is up-to-date. As indicated above in the prior art, the compute device performing the "read" for data in a particular memory location may need to determine who the current owner of the memory location is and when the memory location was last written into. A confirmation can be requested from one or more different possible compute nodes that can have access to that particular memory location.

With the present invention, however, since each memory location is logically allocated to a single compute node whereby that single compute node has the sole ability to write or modify that particular memory location, an overhead for determining whether the data being read is up-to-date can be reduced. In particular, instead of possibly inquiring multiple compute nodes when the last recent write operation was performed (if applicable) for a particular memory location, the reading computing device can now more easily identify the sole compute node that is allowed to write. By directly requesting the information about the particular memory location from the assigned compute device for the memory location, the reading compute node can more easily and directly determine whether the current data being read from the memory location is the most recent modified version.

In other embodiments, when ownership of a particular memory location changes (e.g., reassigned from one compute node to another), information regarding this change in ownership can also be easily retrieved. In particular, an original owner of the particular memory location may store information (e.g., a pointer) that can be used to identify a current owner of the memory location. The owners may periodically and asynchronously publish their respective ownership of memory location that can further speed up the lookup for the current owner of a particular memory location.

Figure 5:
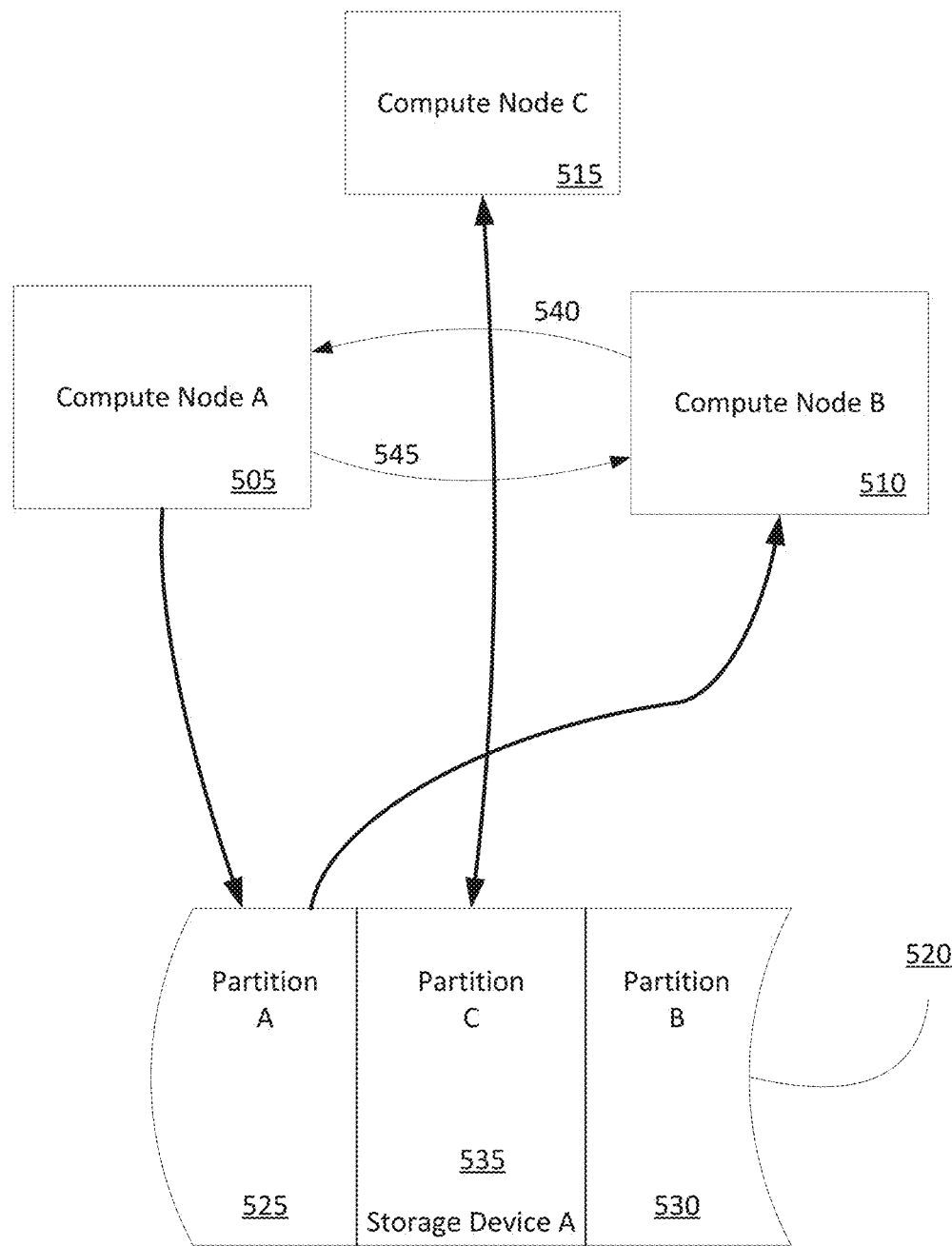
FIG. 5 illustrates a scenario whereby the plurality of compute nodes interact with each other and the storage device to read and/or write data into the storage device.

FIG. 5 illustrates a scenario whereby the plurality of compute nodes interact with each other and the storage device to read and/or write data into the storage device. More specifically, the scenario shows the various communications between the compute nodes and the storage device that may occur during exemplary read processes. As indicated above, each compute node may read or write into their own respective assigned subdivisions without checking with other compute nodes. In order to read data stored in other assigned subdivisions, however, various checks may need to be performed in order to ensure that the correct data is being obtained.

Similar to the scenario illustrated in FIG. 3, the scenario in FIG. 5 includes three compute nodes A, B, and C (505-515) that each have their own respective assigned partition A, B and C (525-535) located in the storage device A 520. If a compute node (e.g., compute node C 515) wishes to read and/or write data into a memory location associated with the compute node's assigned partition (e.g., partition C 535), the compute node can do so without performing any necessary checks with other compute nodes (e.g., compute nodes A and B 505, 510). The compute node can instead perform the process (e.g., read and/or write) directly into the memory location within the assigned partition 560.

In a second example, if a compute node (e.g., compute node B 510) is instructed to read data stored in a memory location not within the assigned partition (e.g., partition A 525), the compute node (e.g., compute node B 510) would need to communicate with the owner (e.g., compute node A 505) of the assigned partition (e.g., partition A 525) where the data is stored. There are a number of steps 540, 545, 550 that the compute node (e.g., compute node B 510) may need to perform prior to obtaining the information 555 from the memory location associated with the assigned partition (e.g., partition A 525) in order to ensure that the data being read is correct. These steps 540, 545, 550 may be performed by the compute node (e.g., compute node B 510) in parallel during an attempted read of the data in a partition not assigned to the compute node (e.g., partition A 525).

As noted above, steps 540, 545, 550 may be performed by compute node B 510 in parallel with a read of data located in a partition A 525. Step 540 corresponds to an initial request by compute node B 510 inquiring about information related to the data located in partition A 525 from the owner of partition A 525 (e.g., compute node A 505). The request may include a request for information from compute node A 505 regarding a current ownership of the memory location where the data is stored and update status of the data. The update status may indicate when the data was last modified by the owner (e.g., compute node A 505). For example, in situations where the data was modified simultaneously with the read (or at least in near succession), it may be desired to instruct compute node B 510 to cancel or ignore the current read and re-read the data stored in the memory location to ensure that the updated version of the data is obtained. Otherwise, if the update status does not pose any potential conflicts regarding the version of the data being currently read, the compute node B 510 can be informed by the owner (e.g., compute node A 505) that the version of the data is up-to-date.

As indicated above, the request performed in step 540 may also request information regarding the ownership of the memory location where the data is located. Generally, data stored in partition A 525 is assigned to compute node A 505. The request would confirm that compute node A 505 is the owner and forward any additional information regarding the data (e.g., update status information). Ownership of partitions, as indicated above, can be re-assigned. In embodiments where the ownership of partitions can be re-assigned based on need (e.g., a compute node performs more reads or writes), this request can confirm whether compute node A 505 is still the owner of partition A 525 or if ownership of the partition has been reassigned to a different compute node. The original owner (e.g., compute node A 505) may include information (e.g., pointer) identifying the new/current owner of the partition. If ownership of the partition has been reassigned, partition B 510 would need to communicate with the new owner for information regarding the data (e.g., update status information).

In step 545, compute node A 505 provides information to compute node B 510 based on the request provided in step 540. Generally, each compute node (e.g., compute node A 505) contains information pertaining to the data stored in its assigned partition. The information, as described above, may inform compute node B 510 whether a current read of the data should be continued (or alternatively cancelled/ignored and restarted). The information may include details as to the current owner of the memory location where the data is stored to ensure that updated information regarding the memory location can be obtained. It should be noted that other types of information may also be requested in step 540 by compute node B 510. Subsequently, responses from compute node A 505 can be provided accordingly. These other types of information may also be used to inform whether a current read could be completed or if the data is up-to-date.

Step 555 corresponds with a read being performed by compute node B 510 to obtain the requested data stored in a memory location associated with partition A 525. Step 555 may be performed in parallel with steps 540, 545, 550 indicated above. Even though an initial read may be started at the same time as steps 540, 545, 550, compute node B 510 may be instructed to cancel or ignore (i.e. discard) the current read based on the outcome of steps 540, 545, 550.

For example, the outcome of steps 540, 545, 550 may indicate that the data being currently read may not be up-to-date. Therefore, it may be desired that compute node B 510 initiate a new read process to ensure that the current data is being obtained.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for coordinating reading and writing processes among computing devices sharing a memory device, the method comprising:
   identifying, by a first computing device of the computing devices, a total number of the computing devices to store data in the memory device;
   creating, by the first computing device, a number of subdivisions within the memory device corresponding to the total number of the computing devices to store data in the memory device;
   assigning, by the first computing device, each of the subdivisions within the memory device to only one of the computing devices, wherein the assigned computing device of one of the subdivisions is an owner of the subdivision and is the only computing device allowed to write or modify data in the subdivision, and other computing devices not assigned to the subdivision are not allowed to write or modify the data in the subdivision; and
   in response to a request to read data in a first subdivision that is assigned to the first computing device, wherein the request is from one of the computing devices not assigned to the first subdivision, allowing the requesting computing device that is not assigned to the first subdivision to read the data in the first subdivision without changing ownership or assignment of the first subdivision based on a determination that the request to read the data in the first subdivision by the requesting computing device includes information correctly identifying the first computing device as the owner of the first subdivision.

2. The method of claim 1, comprising:
   receiving, by the first computing device, a read request from the requesting computing device, the read request requesting access to the data stored in the first subdivision, wherein the requesting computing device performs a read operation corresponding to the read request to obtain the requested data stored in the first subdivision; and
   transmitting, from the first computing device to the requesting computing device, a completion status of the read request to the data in the first subdivision when a data transmission by the requesting computing device is completed.

3. The method of claim 2, comprising:
   initiating, by the requesting computing device, an initial read of data stored in the first subdivision;
   transmitting, from the requesting computing device to the first computing device assigned to the first subdivision, a request for information regarding the data stored in the first subdivision, wherein the information regarding the data includes current ownership of the data and status of the data; and
   receiving, by the requesting computing device, the information regarding the current ownership of the data and status of the data from the first computing device assigned to the first subdivision.

4. The method of claim 3, further comprising:
   receiving, by the requesting computing device, an indication from the first computing device assigned to the first subdivision that the data being read is no longer current, wherein the indication is received either prior to or during the transmission of the completion status; and
   transmitting instructions to the requesting computing device not assigned to the first subdivision performing the read process, wherein the instructions include directions to perform a re-read of data in the first subdivision to obtain an up-to-date version of the data.

5. The method of claim 2, wherein the requesting computing device transmits the request to read data in the first subdivision to the memory device and performs the read operation simultaneously.

6. The method of claim 1, further comprising:
   receiving an indication that the first computing device assigned to the first subdivision is no longer the current owner of the first subdivision; and
   transmitting, from the first computing device, instructions to the requesting computing device not assigned to the first subdivision, wherein the instructions include directions to re-evaluate ownership of the first subdivision, re-requesting data about the first subdivision from the re-evaluated owner of the first subdivision, and re-reading of the data in the first subdivision to obtain an up-to-date version of the data.

7. The method of claim 1, wherein the assigning of the subdivisions is static.

8. The method of claim 1, wherein the assigning of the subdivisions is dynamic.

9. The method of claim 1, wherein a size of the first subdivision assigned to the first computing device is based on a frequency of operation of the first computing device with the memory device.

10. A first computing device comprising: a processor and a memory storing instructions that when executed by the processor cause the processor to:
    identify a total number of computing devices to store data in a memory device;
    create a number of subdivisions within the memory device corresponding to the total number of the computing devices to store data in the memory device;
    assign each of the subdivisions within the memory device to only one of the computing devices, wherein the assigned computing device of one of the subdivisions is an owner of the subdivision and is the only computing device allowed to write or modify data in the subdivision, and other computing devices not assigned to the subdivision are not allowed to write or modify the data in the subdivision; and
    in response to a request from a second computing device that is not assigned to a first subdivision to read data in the first subdivision, allow the second computing device to read the data in the first subdivision without changing ownership or assignment of the first subdivision based on a determination that the request to read the data in the first subdivision by the second computing device includes information correctly identifying a computing device assigned to the first subdivision as the owner of the first subdivision.

11. The first computing device of claim 10, wherein the instructions are to cause the processor to:
receive a read request from the second computing device, the read request requesting access to the data stored in the first subdivision, wherein the second computing device performs a read operation corresponding to the read request to obtain the requested data stored in the first subdivision; and
transmit a completion status to the second computing device when a data transmission by the second computing device is completed.

12. The first computing device of claim 11, wherein the instructions are to cause the processor to simultaneously receive the read request from the second computing device and perform the read operation corresponding to the read request.

13. The first computing device of claim 10, wherein the second computing device not assigned to the first subdivision is to:
initiate an initial read of the data stored in the first subdivision not assigned to the second computing device;
transmit to the computing device assigned to the first subdivision a request for information regarding the data stored in the first subdivision, wherein the information regarding the data includes a current ownership of the data and status of the data; and
receive a completion status from the computing device assigned to the first subdivision if the ownership assignment and status of the data is current.

14. The first computing device of claim 13, wherein the second computing device is to:
receive an indication that the computing device assigned to the first subdivision is no longer the current owner of the first subdivision, wherein the indication is received either prior to or during the transmission of the completion status; and
transmit information to the second computing device not assigned to the first subdivision performing the read process, wherein the transmitted information includes directions to re-evaluate ownership of the first subdivision, re-requesting data about the first subdivision from the re-evaluated owner of the first subdivision, and re-reading of the first subdivision to obtain the up-to-date version of data.

15. The first computing device of claim 10, wherein the instructions are to cause the processor to:
receive an indication from the computing device assigned to the first subdivision that the data being read is no longer current, wherein the indication is received either prior or during the transmission of the completion status; and
transmit information to the second computing device not assigned to the first subdivision performing the read process, wherein the transmitted information includes directions to perform a re-read of the first subdivision to obtain the up-to-date version of data.

16. The first computing device of claim 10, wherein the assigning of each of the subdivisions to each of the computing devices that are connected to the memory device is static.

17. The first computing device of claim 10, wherein the assigning of each of the subdivisions to one of the computing devices is dynamic.

18. The first computing device of claim 10, wherein a size of one of the subdivisions assigned to a particular computing device is based on a frequency of operation of the particular computing device with the memory device.

19. A non-transitory computer readable medium storing instructions that when executed by a processor cause the processor to:
identify a total number of computing devices to store data in a memory device;
create a number of subdivisions within the memory device corresponding to the total number of the computing devices to store data in the memory device;
assign each of the subdivisions within the memory device to only one of the computing devices, wherein the assigned computing device of one of the subdivisions is an owner of the subdivision and is the only computing device allowed to write or modify data in the subdivision, and other computing devices not assigned to the subdivision are not allowed to write or modify the data in the subdivision; and
in response to a request from a first computing device that is not assigned to a first subdivision to read data in the first subdivision, allow the first computing device to read the data in the first subdivision without changing ownership or assignment of the first subdivision based on a determination that the request to read the data in the first subdivision by the first computing device includes information correctly identifying a computing device assigned to the first subdivision as the owner of the first subdivision.

20. The non-transitory computer readable medium of claim 19, wherein the instructions are to cause the processor to:
receive, from the first computing device, a request for information regarding an ownership, which is the assignment, of the first subdivision; and
transmit, to the first computing device, information indicating the ownership of the first subdivision, wherein the first computing device is to utilize the information to read the data stored in the first subdivision.

* * * * *